(No Model.)

J. D. FICHTNER.
NUT LOCK.

No. 506,485. Patented Oct. 10, 1893.

WITNESSES:
Chas. Nida
C. Sedgwick

INVENTOR
J. D. Fichtner
BY Munn & Co
ATTORNEYS.

UNITED STATES PATENT OFFICE.

JOHN D. FICHTNER, OF UNIONTOWN, PENNSYLVANIA.

NUT-LOCK.

SPECIFICATION forming part of Letters Patent No. 506,485, dated October 10, 1893.

Application filed January 23, 1893. Serial No. 459,380. (No model.)

*To all whom it may concern:*

Be it known that I, JOHN D. FICHTNER, of Uniontown, in the county of Fayette and State of Pennsylvania, have invented a new and Improved Nut-Lock, of which the following is a specification, reference being had to the annexed drawings, forming a part thereof, in which—

Figure 1:
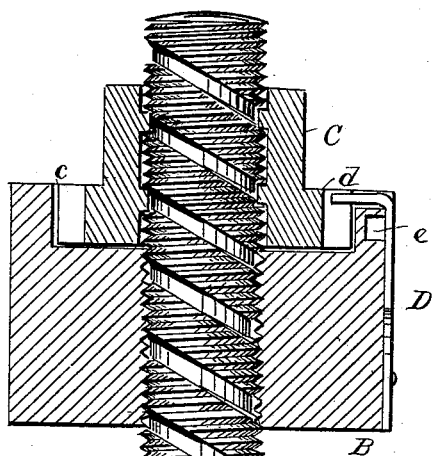
Figure 2:
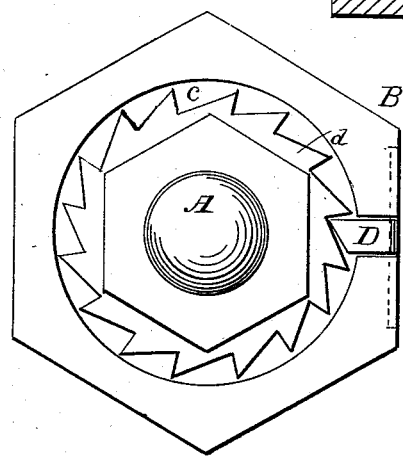
Figure 3:
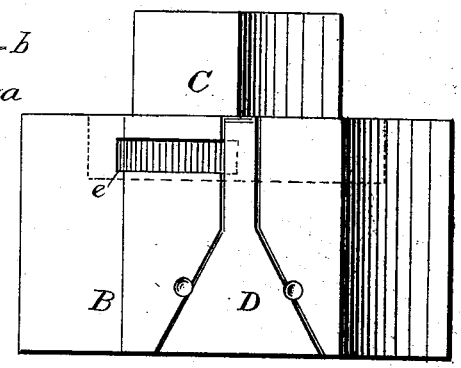

Figure 1 is a longitudinal section of my improved nut lock. Fig. 2 is a plan view; and Fig. 3 is a side elevation of the nut lock detached from the bolt.

Similar letters of reference indicate corresponding parts in all the views.

The object of my invention is to provide a suitable, inexpensive and secure nut lock for fastening the nuts of bolts used in places where an ordinary nut is liable to become loose by jarring or the working of parts connected by the bolts.

My invention consists in a bolt provided with two sets of threads cut in opposite directions, with nuts fitting the threads, the main nut being provided with a chamber and a spring pawl, and the locking nut being fitted to the reverse thread and provided with a ratchet, all as will be hereinafter more fully described.

The bolt A, is provided, in the present case, with a right hand thread $a$ and a left hand thread $b$, the right hand thread being adapted to receive the main nut B, while the left hand thread $b$ has a much greater pitch than the right hand thread $a$. The main nut B is provided with a chamber $c$ in its outer face, and a lock nut C, which is fitted to the left hand thread $b$ is furnished with a ratchet $d$.

In a recess cut in one of the faces of the nut B, is secured a spring pawl D, the free end of which projects at right angles into the chamber $c$, and is adapted to engage the ratchet $d$ of the nut C.

In the side of the nut B, is formed a recess $e$ for receiving a pointed instrument used for disengaging the pawl D from the ratchet $d$.

In using the bolt, the nut B is first applied and screwed up in the usual way, after which the lock nut C is turned on the thread running in the opposite direction, and screwed down against the bottom of the chamber $c$. The downward movement of the nut C brings the ratchet $d$ into engagement with the pawl D, and the said pawl holds the lock nut C in any position in which it may be placed. Any tendency to unscrew the main nut B tightens the lock nut C.

To disengage the lock nut, a pointed instrument is inserted underneath the spring pawl D, removing the said pawl from the ratchet $d$, when the lock nut may be unscrewed, after which the main nut may be unscrewed in the usual way.

In carrying out my invention, I do not limit or confine myself to any particular proportion between the right and left hand threads, nor to any particular kind of thread, as these may be varied without departing from the principle of my invention.

Having thus described my invention, I claim as new and desire to secure by Letters Patent—

1. The combination, of a bolt provided with a right and left hand thread, a chambered main nut furnished with a spring pawl, and a lock nut furnished with a ratchet adapted to enter the chamber of the main nut and fitted for engagement with the pawl carried by the main nut, substantially as specified.

2. The combination of a bolt provided with a right and left hand thread, a chambered main nut provided with a spring pawl and a recess beneath the pawl for the introduction of an instrument to raise the pawl and a lock nut provided at its inner end with a peripheral ratchet to enter the chamber of the main nut and be engaged by the said pawl, substantially as set forth.

JOHN D. FICHTNER.

Witnesses:
J. J. CLOHECY,
ARTHUR K. KNOTTS.